US011922917B2

(12) United States Patent
McCutcheon et al.

(10) Patent No.: US 11,922,917 B2
(45) Date of Patent: Mar. 5, 2024

(54) AUDIO SYSTEM AND SIGNAL PROCESSING METHOD FOR AN EAR MOUNTABLE PLAYBACK DEVICE

(71) Applicant: ams AG, Premstätten (AT)

(72) Inventors: Peter McCutcheon, Eindhoven (NL); Dylan Morgan, Eindhoven (NL)

(73) Assignee: AMS AG, Premstätten (AT)

( * ) Notice: Subject to any disclaimer, the term of this patent is extended or adjusted under 35 U.S.C. 154(b) by 135 days.

(21) Appl. No.: 17/764,926

(22) PCT Filed: Sep. 17, 2020

(86) PCT No.: PCT/EP2020/075992
§ 371 (c)(1),
(2) Date: Mar. 29, 2022

(87) PCT Pub. No.: WO2021/063692
PCT Pub. Date: Apr. 8, 2021

(65) Prior Publication Data

US 2022/0392427 A1 Dec. 8, 2022

(30) Foreign Application Priority Data

Sep. 30, 2019 (EP) .................................... 19200514

(51) Int. Cl.
*G10K 11/178* (2006.01)
*H04R 1/10* (2006.01)

(52) U.S. Cl.
CPC .. *G10K 11/17817* (2018.01); *G10K 11/17854* (2018.01); *G10K 11/17881* (2018.01);
(Continued)

(58) Field of Classification Search
CPC ................ G10K 11/17881; G10K 2210/1081
See application file for complete search history.

(56) References Cited

U.S. PATENT DOCUMENTS 4,494,074 A 1/1985 Bose
5,138,664 A 8/1992 Kimura et al.
(Continued)

FOREIGN PATENT DOCUMENTS

EP 3451327 A1 3/2019
EP 3503572 A1 6/2019

OTHER PUBLICATIONS

Elliot, S.: "Signal Processing for Active Control", Academic Press, 2001, 23 pages.
(Continued)

*Primary Examiner* — Ping Lee
(74) *Attorney, Agent, or Firm* — MH2 TECHNOLOGY LAW GROUP LLP

(57) ABSTRACT

An audio system for an ear mountable playback device comprises a compensation filter configured to generate a third compensation signal by applying filter operations to an audio signal, and an error compensation unit configured to generate a compensated error signal on the basis of the third compensation signal and a disturbed audio signal from an error microphone. The audio system further comprises a first noise filter configured to be adapted based on the compensated error signal, and a detection unit configured to estimate the acoustic leakage condition on the basis of the first noise filter or of the disturbed audio signal and an audio output signal. The compensation filter is configured to be adapted based on the acoustic leakage condition.

18 Claims, 4 Drawing Sheets

(52) U.S. Cl.
CPC ..... *G10K 11/17885* (2018.01); *H04R 1/1083* (2013.01); *G10K 2210/1081* (2013.01); *G10K 2210/3022* (2013.01)

(56) References Cited

U.S. PATENT DOCUMENTS

| | | | |
|---|---|---|---|
| 8,693,700 | B2 | 4/2014 | Bakalos et al. |
| 9,076,431 | B2 | 7/2015 | Kamath et al. |
| 9,293,128 | B2 | 3/2016 | Goldstein |
| 2010/0303256 | A1 | 12/2010 | Clemow |
| 2014/0072135 | A1 | 3/2014 | Bajic et al. |
| 2014/0086425 | A1 | 3/2014 | Jensen et al. |
| 2015/0243271 | A1 | 8/2015 | Goldstein |
| 2017/0110105 | A1 | 4/2017 | Kumar et al. |
| 2017/0140746 | A1 | 5/2017 | Gether et al. |

OTHER PUBLICATIONS

International Search Report and Written Opinion in corresponding International Application No. PCT/EP2020/075992, dated Nov. 25, 2020, 12 pages.

AUDIO SYSTEM AND SIGNAL PROCESSING METHOD FOR AN EAR MOUNTABLE PLAYBACK DEVICE

CROSS-REFERENCE TO RELATED APPLICATIONS

The present application is the national stage entry of International Patent Application No. PCT/EP2020/075992, filed on Sep. 17, 2020, and published as WO 2021/063692 A1 on Apr. 8, 2021, which claims the benefit of priority of European Patent Application No. 19200514.8, filed on Sep. 30, 2019, all of which are incorporated by reference herein in their entireties.

FIELD OF THE INVENTION

The present disclosure relates to an audio system and to a signal processing method, each for an ear mountable playback device, e.g. a headphone, comprising a speaker.

BACKGROUND OF THE INVENTION

Nowadays a significant number of headphones, including earphones, employ techniques that enhance the sound experience of a user, such as noise cancellation techniques. For example, such noise cancellation techniques are referred to as active noise control or ambient noise cancellation, both abbreviated with ANC. ANC generally makes use of recording ambient noise that is processed for generating an anti-noise signal, which is then combined with a useful audio signal to be played over a speaker of the headphone. ANC can also be employed in other audio devices like handsets or mobile phones.

Various ANC approaches make use of feedback, FB, microphones, feedforward, FF, microphones or a combination of feedback and feedforward microphones. Efficient FF and FB ANC is achieved by tuning a filter or by adjusting an audio signal, e.g. via an equalizer, based on given acoustics of a system.

Hybrid noise cancellation headphones are generally known. For instance, a microphone is placed inside a volume that is directly acoustically coupled to the ear drum, conventionally close to the front of the headphones driver. This is referred to as the feedback (FB) microphone. A second microphone, the feedforward (FF) microphone, may be placed on the outside of the headphone, such that it is acoustically decoupled from the headphones driver.

For each system to work effectively, the headphone preferably makes a near perfect seal to the ear/head of the user which does not change whilst the device is worn and that is consistent for any user. Any change in this seal as a result of a poor fit will change the acoustics and ultimately the ANC performance. This seal is typically between the ear cushion and the user's head, or between an earphone's rubber tip and the ear canal wall.

For most noise cancellation headphones and earphones, effort is put into maintaining a consistent fit when being worn and from user to user to ensure that the headphone acoustics do not change and always have a good match to the noise filters. However, "leaky" earphones and headphones, which do not make a seal between the ear cushion/tips and the ear, have a large variation in the acoustics when worn by different people. Furthermore the acoustics can vary for the user whilst the earphone moves in their ear as a result of typical everyday head movements. Therefore, for any headphones or earphones which are leaky, some adaptation is required to ensure that the filters always match the acoustics.

An objective to be achieved is to provide an improved concept for adjusting active noise control algorithms to an acoustic leakage condition of an ear mountable playback device like a headphone, earphone or mobile handset.

This object is achieved with the subject matter of the independent claims. Embodiments and developments of the improved concept are defined in the dependent claims. The improved concept is based on the idea of estimating an acoustic leakage condition in terms of its extent, i.e. determining a degree of acoustic leakage between an ear mountable playback device and the ear canal of the user, during regular usage of said ear mountable playback device. This leakage condition is consequently used to enhance the sound experience of the user, e.g. by removing unwanted portions of a sound signal transmitted to the ear canal of the user via noise control algorithms. Said unwanted portions may be ambient noise with a degree that is dependent on the extent of the acoustic leakage, for instance. In order to achieve a sufficient noise control without attenuating the wanted signal, e.g. an audio signal such as a music signal, the improved concept further employs a compensation filter that matches a driver to FB microphone response transfer function of the ear mountable playback device such that efficient signal subtraction may be performed for optimal noise control results.

In contrast, at present tuning of noise control filters, such as feedforward and feedback filters, for conventional earphones and headsets is only performed once during or at the end of production of the ANC devices, for example by measuring acoustic properties of the device. In particular, tuning is performed during a calibration process with some measurement fixture like an artificial head with a microphone in the ear canal of the artificial head. The measurement, including the playing of some test sound, is coordinated from some kind of processing device which can be a personal computer or the like. To achieve an optimum ANC performance for each ANC device produced, a dedicated measurement has to be performed for each of the ANC devices under control of the processing device, which is time-consuming, especially if larger volumes of ANC devices are to be calibrated.

SUMMARY OF THE INVENTION

In the following, the improved concept will be explained, sometimes referring to a headphone or earphone as an example of the playback device. However, it shall be appreciated that this example is not limiting and will also be understood by a skilled person for other kinds of playback devices where different acoustic leakage conditions can occur during usage by a user. In general the term playback device should include all types of audio reproducing devices.

In an embodiment of an audio system according to the improved concept, which is to be used for an ear mountable playback device like a headphone, earphone, mobile phone, handset or the like, this system comprises a speaker that is configured to generate a speaker signal on the basis of an audio output signal. The system further comprises an error microphone that is configured to generate a disturbed audio signal on the basis of ambient noise and the speaker signal. A further microphone of the audio system is configured to generate a noise signal on the basis of the ambient noise. The audio system further comprises a first noise filter that is configured to generate a first compensation signal by applying filter operations to the noise signal, and to be adapted based on a compensated error signal.

The audio system according to the improved concept further comprises a first mixer that is configured to generate the audio output signal by superimposing an audio signal, the first compensation signal and a second compensation signal. A compensation filter of the audio system is configured to generate a third compensation signal by applying filter operations to the audio signal, and to be adapted based on an acoustic leakage condition. A second noise filter is configured to generate the second compensation signal by applying filter operations to an intermediate compensation signal that is generated by subtracting the third compensation signal from the disturbed audio signal.

The audio system further comprises an error compensation unit that is configured to generate the compensated error signal on the basis of the disturbed audio signal and the third compensation signal. Furthermore, the audio system further comprises a detection unit that is configured to estimate the acoustic leakage condition on the basis of a response of the first noise filter or of the disturbed audio signal and the audio output signal.

For example, the speaker of the audio system is arranged in a housing of the playback device such that a first volume is arranged on the preferential side for sound emission of the speaker. The housing may have an opening for coupling the first volume to the ear canal volume of the user. The housing may further comprise a front vent that is covered with an acoustic resistor and couples the first volume to the ambient environment. The front volume will also be coupled to the ambient environment via an acoustic leakage due to an imperfect fit of the earphone to the ear of the user. This acoustic leakage varies from person to person and depends on how the earphone sits in the ear at a specific time. The error microphone is for example a feedback error microphone that is arranged within the first volume such that it detects sound output from the speaker as well as ambient sound, i.e. ambient noise. For example, it is arranged close to the opening.

In addition, a second volume is arranged within the housing on the side of the speaker facing away from the preferential side for sound emission. The second volume is acoustically coupled to the ambient environment via a rear vent of the housing which may also be covered with an acoustic resistor. The further microphone may for example be a feedforward microphone which is for example arranged outside of the rear volume, i.e. at the outside of the housing, in order to predominantly sense ambient noise.

The first noise filter is a feedforward noise filter, for instance, and is configured to generate the first compensation signal by filtering the noise signal from the feedforward microphone. The feedforward active noise control, FF ANC, algorithm detects the ambient noise outside the headphone via the feedforward microphone, processes it via the first noise filter and provides an anti-noise signal, the first compensation signal, to the speaker such that superposition of the anti-noise signal and the noise signal occurs at the location of the ear in order to produce noise cancellation. In detail, the residual noise ERR at the location of the ear and/or the error microphone can be characterized by $$Err = AE - AFFM \cdot F \cdot DE,$$

wherein AE is the ambient to ear acoustic transfer function, AFFM is the ambient to FF microphone transfer function, F is the FF filter and DE is the driver to ear acoustic transfer function.

In order to minimize the residual noise, an efficient FF ANC requires matching the first noise filter F to a target acoustic response:

$$F = \frac{AE}{AFFM \cdot DE}.$$

The second noise filter is a feedback noise filter, for instance, and is configured to generate the second compensation signal by filtering an intermediate compensation signal that may correspond to the disturbed audio signal from which the wanted signal, e.g. the audio signal, or a signal derived from the wanted signal, i.e. the third compensation signal, is subtracted. In other words, the intermediate compensation signal is composed primarily, if not exclusively, of the portion of the disturbed audio signal that is generated by the ambient noise by means of the error microphone, in the following referred to as the noise portion.

The first mixer is configured to generate the audio output signal that is provided to the speaker by means of superimposing the audio signal, the first compensation signal and the second compensation signal. In this context, the first and the second compensation signal correspond to signals that destructively interfere with the ambient noise between the speaker and the error microphone and/or the ear canal of a user of the ear mountable playback device.

The compensation filter is for example a filter analogous to that described in US 2017/0140746 A1. According to the improved concept, the compensation filter in this disclosure serves a twofold of purposes. For both these purposes, the compensation filter applies filter operations to the audio signal for generating the third compensation signal in such a manner that the third compensation signal is primarily, or exclusively, composed of the portion of the disturbed audio signal that is generated from the speaker signal and detected by the error microphone, in the following referred to as the speaker portion.

Firstly, this provides a music compensation mechanism that compensates for the audio signal being attenuated by the feedback active noise control, FB ANC, algorithm since the second noise filter in this case primarily, or exclusively, applies filter functions to the noise portion of the disturbed audio signal. In detail, the intermediate compensation signal that is provided to the second noise filter is primarily, or exclusively, composed of the noise portion of the disturbed audio signal with, if at all, merely a negligible speaker portion.

Secondly, for a music removal mechanism, the third compensation signal is provided to the error compensation unit, which generates from the disturbed audio signal and from the third compensation signal the compensated error signal. For example, the error compensation unit adapts the third compensation signal to match it to the speaker portion of the disturbed audio signal. In detail, the error compensation unit generates the compensated error signal that comprises the noise portion of the disturbed audio signal and at most merely a negligible contribution of the speaker portion.

The compensated error signal is consequently used to adapt, for example by means of the detection unit or of a tuning unit, a response of the first noise filter in a manner that ambient noise detected by the further microphone can be removed from the disturbed audio signal, i.e. the signal detected by the error microphone, in a more efficient manner by means of a feedforward active noise control algorithm, FF ANC, as described above, for instance. To this end, an exact matching of the response of the first noise filter for efficient FF ANC hence requires a near-to-perfectly compensated error signal that only comprises the noise contribution of the disturbed audio signal.

In reality, the acoustic transfer functions can change depending on the headphones fit. For leaky earphones, which have a highly variable leak acoustically coupling the front volume to the ambient environment, the transfer functions AE, DE and the acoustic transfer function from the driver to the error microphone, DFBM, change substantially such that it is necessary to adapt at least the first noise filter and optionally also the second noise filter in response to the acoustic signals in the ear canal to minimize the error.

From the adapted response of the first noise filter or from the driver to error microphone transfer function, the acoustic leakage condition can be detected and estimated by means of the detection unit. For example, the detection unit is configured to compare the audio output signal to the disturbed audio signal and to estimate the acoustic leakage condition based on the result of the comparison, e.g. based on a deviation between the two signals.

Alternatively or in addition, the detection unit is configured to monitor a response of the first noise filter and to estimate the acoustic leakage condition based on said response. For example, the detection unit is configured to compare the response of the first noise filter to predetermined responses for estimating the acoustic leakage condition.

The acoustic leakage condition is consequently used to adapt the compensation filter. For example, a response of the compensation filter is adapted according to a current or to a changing acoustic leakage. For example, the response of the compensation filter is configured to match an acoustic leakage dependent driver response between the speaker and the error microphone. This way, efficient noise control algorithms as explained above can be realized in order to enhance the sound experience of a user of the ear mountable playback device.

In some embodiments, the error compensation unit comprises a second mixer that is configured to generate the compensated error signal by subtracting from the disturbed audio signal a removal signal that is based on the third compensation signal.

In order to match the third compensation signal as close as possible to the noise portion of the disturbed audio signal, the error compensation unit in these embodiments is configured to further adjust the third compensation signal to achieve a better match to the driver to error microphone response, for example by means of applying further filter functions.

In some embodiments, the error compensation unit further comprises a filter element that is configured to generate the removal signal from the third compensation signal. Furthermore, for generating the removal signal, the filter element can be configured to apply filter operations to the third compensation signal. Alternatively or in addition, for generating the removal signal, the error compensation unit can be configured to control an adjustable gain of the filter element depending on the third compensation signal and the compensated error signal.

For example, the error compensation unit comprises a feedback loop that is configured to control the filter element, e.g. an adjustable gain and/or a response of the filter element, based on a deviation between the compensated error signal and the third compensation signal. This enables efficient matching of the third compensation signal to the speaker portion of the disturbed audio signal. This way, the noise portion of the disturbed audio signal can be efficiently isolated as the compensated error signal.

In some embodiments, the error compensation unit is configured to control the adjustable gain by applying an error minimization algorithm, in particular a least mean squares algorithm, to the third compensation signal and the compensated error signal.

In cases, in which the determined leakage condition is inaccurate, e.g. during or before the adaption process of the audio system, the filter parameters of the compensation filter can be partially inaccurate. An error minimization algorithm can especially in these cases lead to additional accuracy and/or to a faster adaptation.

In some embodiments, the second noise filter is further configured to be adapted based on the leakage condition.

In these embodiments, also the response of the second noise filter, i.e. the feedback filter, is adapted based on a current or on a changing acoustic leakage condition. This allows for further increasing the efficiency of the active noise control as also the performance of the FB ANC can be highly dependent on the acoustic leakage condition.

In some embodiments, the detection unit is configured to estimate the leakage condition on the basis of the disturbed audio signal and the audio output signal if a ratio between the speaker signal and the ambient noise exceeds a set threshold. Moreover, the detection unit in these embodiments is configured to estimate the leakage condition on the basis of the first noise filter, in particular of filter parameters of the first noise filter, otherwise.

Depending on the sound pressure level of the speaker signal and hence the contribution of ambient noise in the disturbed audio signal, the determination of the acoustic leakage may be more accurate in one way compared to the other. For example, if an audio signal is output from the speaker at a high sound pressure level, compared to the ambient noise level, the determination of the acoustic leakage condition via the driver response may be more accurate compared to situations at which a low level, or no, audio signal is being output from the speaker. In the latter case, the leakage determination via the response of the first filter is more accurate. The detection unit in these embodiments is therefore configured to determine a ratio between the speaker signal and the ambient noise and based on this determination estimate the acoustic leakage condition following the corresponding method.

In some embodiments, the leakage condition characterizes an acoustic leakage between an ambient of the playback device and a volume which is defined by an ear canal of a user and a cavity of the playback device. Herein, the cavity is arranged at a preferential side for sound emission of the speaker.

In some embodiments, estimating the leakage condition comprises determining a leakage value.

A convenient way of describing the acoustic leakage condition is the determination of an actual leakage value that quantifies the acoustic leakage condition currently present. For example, the leakage value is calculated as a normalized value between 0 and 1 scaling the determined acoustic leakage to a predetermined maximum and/or minimum acoustic leakage. A leakage value of 0 indicates the smallest possible acoustic leakage or no leak and a leakage value of 1 indicates the largest acceptable acoustic leakage, i.e. if the playback device has a very large leak between the front volume and the ambient environment.

In some embodiments, the compensation filter is adapted on the basis of a comparison of the leakage condition with reference leakage conditions in a lookup table.

For example, the lookup table comprises a number of predetermined acoustic leakage conditions, e.g. calibration leakage values measured at different acoustic leakage conditions that are associated to parameters of the compensation filter. The detection unit or a tuning unit may comprise a memory with said lookup table and be configured to adapt the response of the compensation filter by setting one of the associated parameters depending on the estimated acoustic leakage condition.

The lookup table can be coarse, for example it comprises five predetermined acoustic leakage conditions. The detection unit or the tuning unit can then be configured to interpolate the parameters of the compensation filter from two adjacent points of the lookup table if the estimated leakage condition is in between two predetermined acoustic leakage conditions. This process is sufficiently adequate for the music compensation mechanism.

However, for the music removal mechanism, a higher level of isolation of the noise portion of the disturbed audio signal is essential. Therefore, for the music removal mechanism an error compensation unit is employed in order to reduce the significant error between the response of the compensation filter and the driver response. This realizes a significantly improved accuracy of the music signal being removed from the disturbed audio signal during the generation of the compensated error signal.

An employment of the error compensation unit for both the music compensation and the music removal mechanism, e.g. via an adjustable gain of the compensation filter itself, for highly optimized music compensation and music removal filters seems obvious, however, is actually disadvantageous. In detail, any adaption of the music compensation filter, e.g. via adapting a gain, requires an error signal to feedback any deviation from the target response, as described above for some embodiments. If the adjustable gain is a gain of the compensation filter itself, the operation of the feedback loop that is configured to reduce the speaker portion for generating the compensated error signal can result in the desired adaptation of the gain of the compensation filter in order to match the driver response for effectively removing as much speaker signal from the disturbed audio signal as possible. However, the operation of the feedback loop can also result in the reduction of the gain of the compensation filter in order to reduce the amount of audio signal reaching the second noise filter. This is an undesired effect as the audio signal, e.g. music, would be significantly attenuated from the perspective of the user.

The proposed solution of a lookup table for the music compensation mechanism therefore removes this conflict and in addition simplifies processing since operating an adaptive process requires additional computational steps for realizing safety measures for ensuring stability. A lookup table for the music compensation mechanism with a small error of e.g. 1 dB is acceptable as there is no direct reference. That is, the user would perceive a slightly different spectrum of sound coming from the headphone relative to the driver response when noise cancellation is off, however, this difference is small enough to be barely noticeable in normal operation, and small compared to the difference in spectrum due to a changing leakage.

In contrast, if there is a similarly small error in the music removal mechanism between the noise portion of the disturbed audio signal and the third compensation signal, the attenuation, or removal, of the speaker signal for generating the compensated error signal would be substantially reduced. As the third compensation signal is to be subtracted from the disturbed audio signal, i.e. it is directly compared to it, a near-to-perfect match for good attenuation is required. Therefore, an additional adaptive stage realized by the error compensation unit is employed for the music removal mechanism.

The object is further solved by an ear mountable playback device that comprises an audio system according to one of the embodiments described above. For example, the ear mountable playback device is a headphone or an earphone. In general, the term playback device includes all types of audio reproducing devices. Where the term music is specified, it should be appreciated that this term can include any known signal e.g. a voice recording.

The object is further solved by a signal processing method for an ear mountable playback device with a speaker generating a speaker signal based on an audio output signal, with a further microphone that is configured to generate a noise signal on the basis of the ambient noise, and with an error microphone that is configured to generate a disturbed audio signal on the basis of the speaker signal and the ambient noise. The method comprises generating a first compensation signal by applying filter operations of a first noise filter to the noise signal, generating the audio output signal by superimposing an audio signal, the first compensation signal and a second compensation signal, and generating a third compensation signal by applying filter operations of a compensation filter to the audio signal. The method further comprises generating the second compensation signal by applying filter operations of a second noise filter to an intermediate compensation signal that is generated by subtracting the third compensation signal from the disturbed audio signal.

The method further comprises generating a compensated error signal based on the disturbed audio signal and the third compensation signal, estimating a leakage condition on the basis of the first noise filter or of the disturbed audio signal and the audio output signal, adapting the first noise filter based on the compensated error signal, and adapting the compensation filter based on the leakage condition.

Further embodiments of the signal processing method become apparent to a person skilled in the art from the embodiments of the audio system described above.

BRIEF DESCRIPTION OF THE DRAWINGS

The improved concept will be described in more detail in the following with the aid of drawings. Elements having the same or similar function bear the same reference symbols throughout the drawings. Hence their description is not necessarily repeated in the description to the following drawings.

In the drawings.

DETAILED DESCRIPTION

Figure 1:
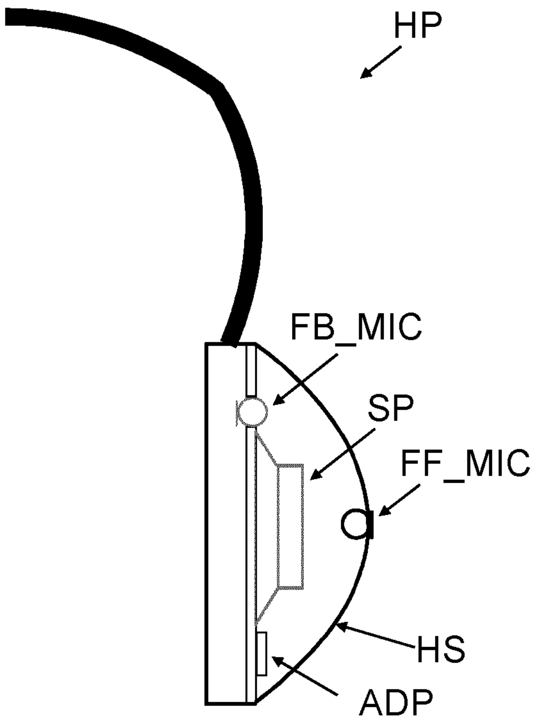
FIG. 1 shows a schematic view of a headphone.

FIG. 1 shows a schematic view of an ANC enabled playback device in form of a headphone HP that in this example is designed as an over-ear or circumaural headphone. Only a portion of the headphone HP is shown, corresponding to a single audio channel. However, extension to a stereo headphone will be apparent to the skilled reader. The headphone HP comprises a housing HS carrying a speaker SP, a feedback noise microphone or error microphone FB_MIC and an ambient noise microphone or feedforward microphone FF_MIC. The error microphone FB_MIC is particularly directed or arranged such that it records both ambient noise and sound played over the speaker SP. Optionally, the error microphone FB_MIC is arranged in close proximity to the speaker, for example close to an edge of the speaker SP or to the speaker's membrane. Alternatively, the error microphone FB_MIC may be arranged close to the ear canal of the user of the headphone HP. The ambient noise/feedforward microphone FF_MIC is particularly directed or arranged such that it mainly records ambient noise from outside the headphone HP.

The error microphone FB_MIC may be used according to the improved concept to provide an error signal being the basis for a determination of the wearing condition, respectively acoustic leakage condition, of the headphone HP, when the headphone HP is worn by a user.

In the embodiment of FIG. 1, an adaptation unit ADP that may comprise a detection unit DET, a tuning unit TU and/or an error compensation unit ECU according to the improved concept is located within the headphone HP for performing various kinds of signal processing operations, examples of which will be described within the disclosure below. The tuning unit TU, the detection unit DET and the error compensation unit ECU may be arranged as a single unit or separately. They may also be placed outside the headphone HP, e.g. in an external device located in a mobile handset or phone or within a cable of the headphone HP.

Figure 2:
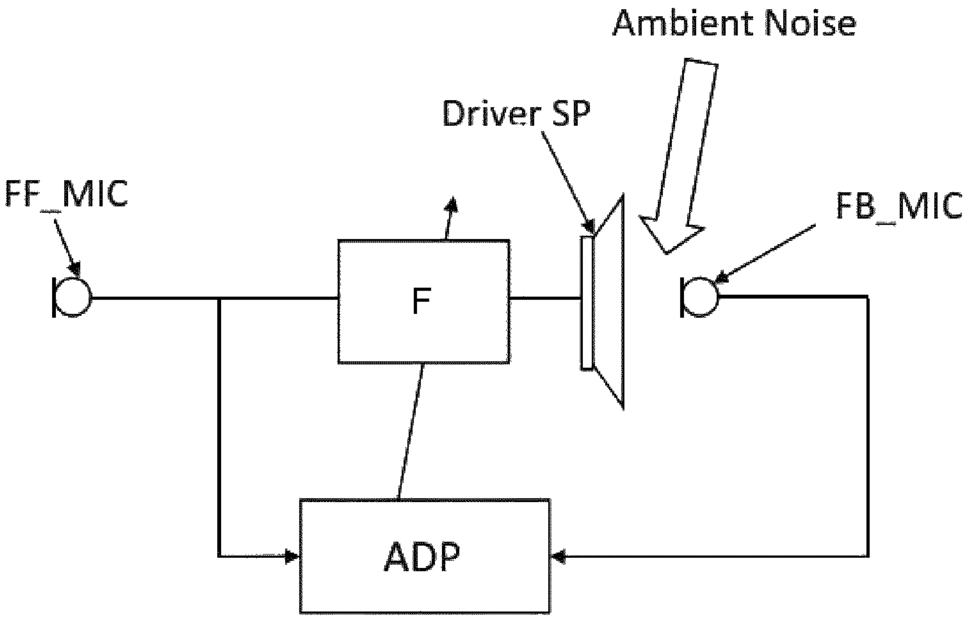
FIG. 2 shows a block diagram of a generic adaptive ANC system.

FIG. 2 shows a block diagram of a generic adaptive ANC system. The system comprises the error microphone FB_MIC and the feedforward microphone FF_MIC, both providing their output signals to an adaptation unit ADP. The noise signal recorded with the feedforward microphone FF_MIC is further provided to a feedforward filter F for generating an anti-noise signal being output via the speaker SP. At the error microphone FB_MIC, the sound being output from the speaker SP combines with ambient noise and is recorded as an error signal that includes the remaining portion of the ambient noise after ANC. This error signal is used by the sound adaptation unit ADP for adjusting a filter response of the feedforward filter.

Figure 3:
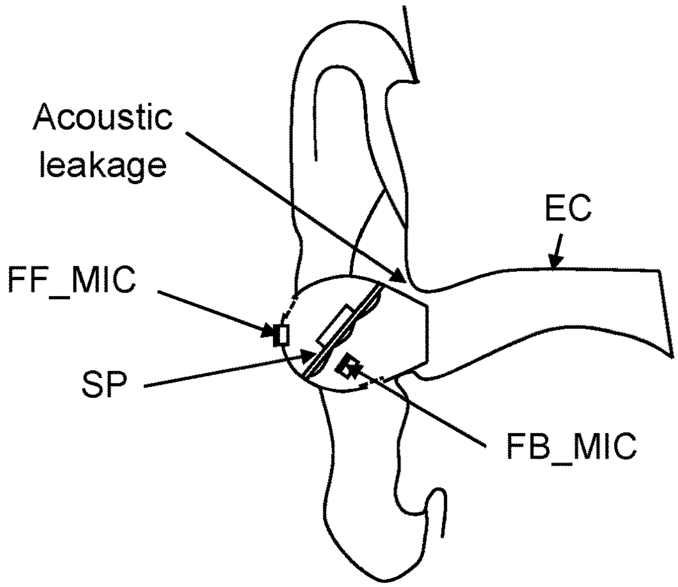
FIG. 3 shows an example representation of a "leaky" type earphone.

FIG. 3 shows an example representation of a "leaky" type earphone, i.e. an earphone featuring some leakage between the ambient environment and the ear canal EC. In particular, a sound path between the ambient environment and the ear canal EC exists, denoted as "acoustic leakage" in the drawing.

Figure 4:
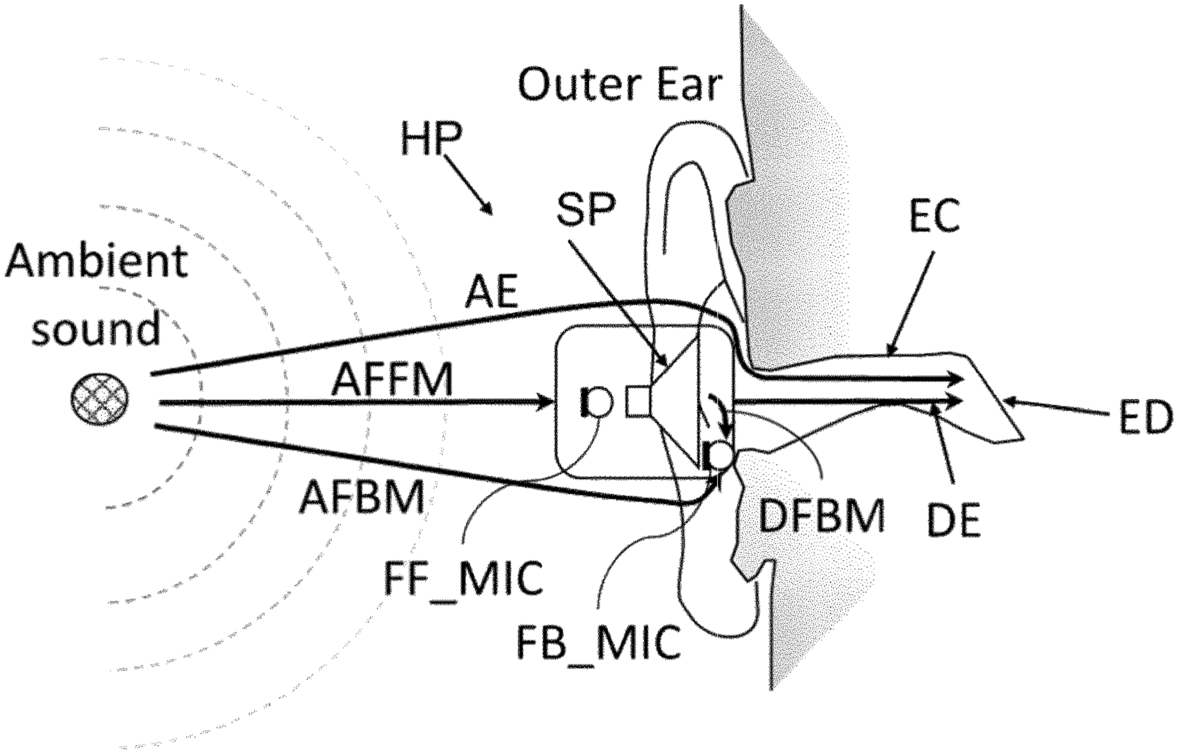
FIG. 4 shows an example headphone worn by a user with several sound paths from an ambient sound source.

FIG. 4 shows an example configuration of a headphone HP worn by a user with several sound paths. The headphone HP shown in FIG. 4 stands as an example for any ear mountable playback device of a noise cancellation enabled audio system AS and can e.g. include in-ear headphones or earphones, on-ear headphones or over-ear headphones. Instead of a headphone, the ear mountable playback device could also be a mobile phone or a similar device.

The headphone HP in this example features a loudspeaker SP, a feedback noise microphone FB_MIC and, optionally, an ambient noise microphone FF_MIC, which e.g. is designed as a feedforward noise cancellation microphone. Internal processing details of the headphone HP are not shown here for reasons of a better overview.

In the configuration shown in FIG. 4, several sound paths exist, of which each can be represented by a respective acoustic response function or acoustic transfer function. For example, a first acoustic transfer function DFBM represents a sound path between the speaker SP and the feedback noise microphone FB_MIC, and may be called a driver-to-feedback response function. The first acoustic transfer function DFBM may include the response of the speaker SP itself. A second acoustic transfer function DE represents the acoustic sound path between the headphone's speaker SP, potentially including the response of the speaker SP itself, and a user's eardrum ED being exposed to the speaker SP, and may be called a driver-to-ear response function. A third acoustic transfer function AE represents the acoustic sound path between the ambient sound source and the eardrum ED through the user's ear canal EC, and may be called an ambient-to-ear response function. A fourth acoustic transfer function AFBM represents the acoustic sound path between the ambient sound source and the feedback noise microphone FB_MIC, and may be called an ambient-to-feedback response function. The driver response that is subject to this disclosure results from the first acoustic transfer function DFBM and the fourth acoustic transfer function AFBM, i.e. the total sound signal detected by the error microphone FB_MIC.

Concerning the ambient noise microphone FF_MIC, a fifth acoustic transfer function AFFM represents the acoustic sound path between the ambient sound source and the ambient noise microphone FF_MIC, and may be called an ambient-to-feedforward response function.

Response functions or transfer functions of the headphone HP, in particular between the microphones FB_MIC and FF_MIC and the speaker SP, can be used with a feedback filter function B and feedforward filter function F, which may be parameterized as noise cancellation filters during operation.

Any processing of the microphone signals or any signal transmission are left out in FIG. 4 for reasons of a better overview. However, processing of the microphone signals in order to perform ANC may be implemented in a processor located within the headphone or other ear-mountable playback device or externally from the headphone in a dedicated processing unit. The processor or processing unit may be called an adaptation unit. If the processing unit is integrated into the playback device, the playback device itself may form a noise cancellation enabled audio system AS. If processing is performed externally, the external device or processor together with the playback device may form the noise cancellation enabled audio system AS. For example, processing may be performed in a mobile device like a mobile phone or a mobile audio player, to which the headphone is connected with or without wires.

In the various embodiments, the FB or error microphone FB_MIC may be located in a dedicated cavity, as for example detailed in ams application EP17208972.4.

Figure 5:
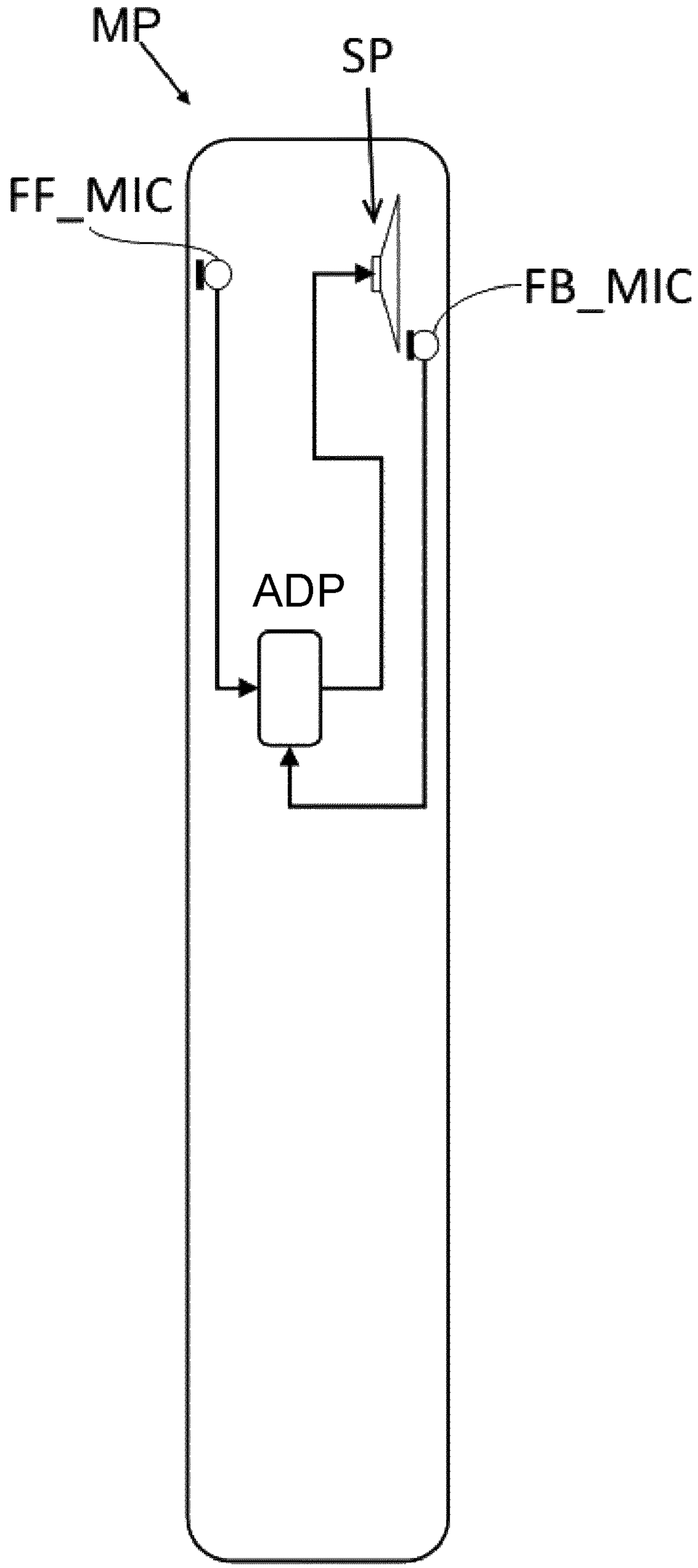
FIG. 5 shows an example representation of an ANC enabled handset.

Referring now to FIG. 5, another example of a noise cancellation enabled audio system AS is presented. In this example implementation, the system is formed by a mobile device like a mobile phone MP that includes the playback device with speaker SP, feedback or error microphone FB_MIC, ambient noise or feedforward microphone FF_MIC and an adaptation unit ADP for performing inter alia ANC and/or other signal processing during operation.

In a further implementation, not shown, a headphone HP, e.g. like that shown in FIG. 1 or FIG. 4, can be connected to the mobile phone MP wherein signals from the microphones FB_MIC, FF_MIC are transmitted from the headphone to the mobile phone MP, in particular the mobile phone's processor PROC for generating the audio signal to be played over the headphone's speaker. For example, depending on whether the headphone is connected to the mobile phone or not, ANC is performed with the internal components, i.e. speaker and microphones, of the mobile phone or with the speaker and microphones of the headphone, thereby using different sets of filter parameters in each case.

In the following, several implementations of the improved concept will be described in conjunction with a specific use case. It should however be apparent to the skilled person that details described for the implementation may still be applied to other implementations.

Figure 6:
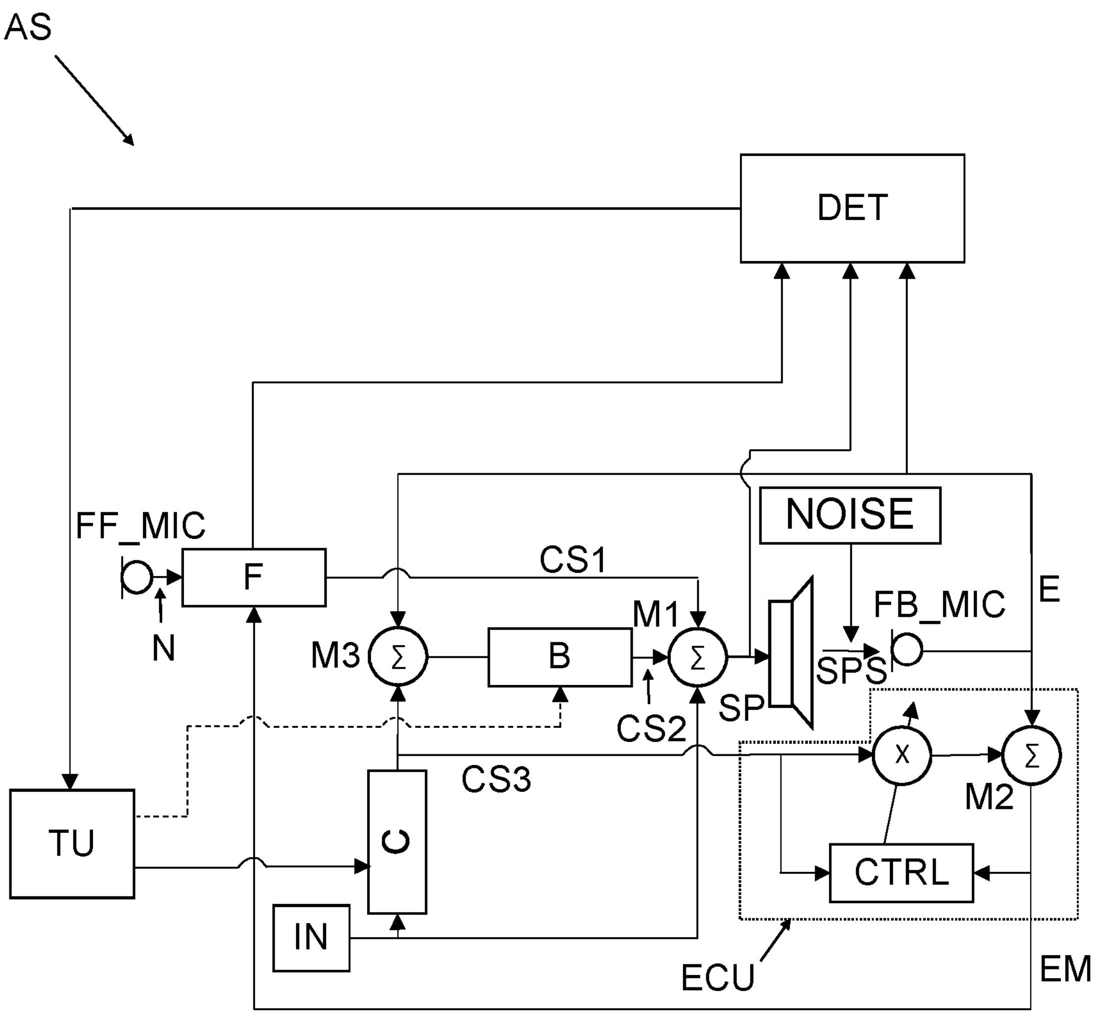
FIG. 6 shows a block diagram of an exemplary embodiment of an audio system for an ear mountable playback device according to the improved concept.

FIG. 6 shows a block diagram of a hybrid ANC audio system AS according to the improved concept. The audio system AS comprises the error microphone FB_MIC and the feedforward microphone FF_MIC. The noise signal N from the feedforward microphone FF_MIC is provided to a feedforward type first noise filter F for generating the first compensation signal CS1 as an anti-noise signal which is provided to the first mixer M1. At the error microphone FB_MIC, the speaker signal SPS combines with ambient noise NOISE and is recorded as a disturbed audio signal E that includes the remaining portion of the ambient noise after ANC.

The disturbed audio signal E is provided to the third mixer M3 which performs a music compensation process, i.e. subtracts the third compensation signal CS3 from said disturbed audio signal E and provides the resulting intermediate compensation signal to the feedback type second noise filter B for generating a further anti-noise signal, the second compensation signal CS2. For the subtraction, the third mixer M3 may be an additive mixer that comprises a signal inverter on one of its inputs, for instance. The second compensation signal CS2 is superimposed with the audio signal IN, e.g. a music signal, and the first compensation signal CS1 by means of the first mixer M1 for generating the audio output signal, which is converted to the speaker signal SPS by means of the speaker SP.

The third compensation signal CS3 is generated from the audio signal IN by means of the compensation filter C. The third compensation signal CS3 is provided to third mixer M3, as mentioned above, and in addition to the error compensation unit ECU for a music removal process. In detail, the error compensation unit ECU is configured to adjust the third compensation signal CS3 such that it matches the speaker portion of the disturbed audio signal E. The second mixer M2 of the error compensation unit ECU generates the compensated error signal EM by subtracting the adjusted compensation signal from the disturbed audio signal E such that the compensated error signal EM only, or substantially only, comprises the noise portion of the disturbed audio signal E.

The adjusted compensation signal is generated from the third compensation signal CS3 by applying filter operations of an adjustable filter element X to the third compensation signal CS3. For example, the adjustable filter element X is an adjustable gain and is adjusted by means of a feedback loop comprising a control unit CTRL that compares the third compensation signal CS3 and the compensated error signal EM and based on this comparison adjusts the gain of the adjustable filter element X. To this end, the control unit CTRL applies an error minimization algorithm, e.g. a least mean squares algorithm, for instance.

The response of the first noise filter F is adjusted depending on the compensated error signal EM such that a residual noise portion in the disturbed audio signal E is more efficiently removed by means of the first compensation signal CS1, i.e. by means of FF ANC.

The detection unit DET is configured to estimate an acoustic leakage condition from the response of the first noise filter F or from the disturbed audio signal E and the audio output signal. If a level of the audio signal IN exceeds a predetermined threshold relative to a level of the ambient noise NOISE or noise N, the detection unit DET estimates the acoustic leakage condition from the driver response, i.e. the disturbed audio signal E and the audio output signal, for instance, and otherwise from the response of the first noise filter F. In order to determine whether said threshold is exceeded, the detection unit can be configured to measure a level of the audio portion relative to the noise portion of the disturbed audio signal E, for instance.

Regarding the estimation of the acoustic leakage condition via the driver response, the detection unit can be configured to compare the audio output signal to the disturbed audio signal and to estimate the acoustic leakage condition based on the result of the comparison, e.g. based on a deviation between the two signals.

Concerning the estimation of the acoustic leakage condition via the response of the first noise filter F, the detection unit can be configured to monitor the adjustable response of the first noise filter F and to estimate the acoustic leakage condition based on said response. For example, the detection unit is configured to compare the response of the first noise filter F to predetermined responses for estimating the acoustic leakage condition The detection engine DET can be configured to generate a leakage value for quantifying the actual leakage condition of the earphone. Consequently, the leakage value is provided to the tuning unit TU for adjusting the response of the compensation filter C such that it matches the driver response, i.e. the transfer function from the speaker SP to the error microphone FB_MIC. For example, the tuning unit TU comprises a memory with a lookup table that comprises a number of reference leakage values and respective associated filter responses. The tuning unit TU is then configured to adjust the response of the compensation filter C by setting one of the associated filter responses depending on the leakage value received from the detection unit DET. The tuning unit TU can further be configured to interpolate the adaptation of the compensation filter C if the leakage value received from the detection unit DET is between two of the reference leakage values.

In addition, the tuning unit TU can be further configured to adjust the response of the second noise filter B depending on the leakage value received from the detection unit DET, e.g. based on a second lookup table.

The tuning unit TU, the detection unit DET and the error compensation unit ECU combined essentially constitute the adaptation unit ADP illustrated in FIGS. 1, 2 and 5 and can be arranged as a combined ASIC in a single package, for instance.

The embodiment of the audio system AS illustrated in FIG. 6 realizes ANC comprising FB ANC and adaptive FF ANC in combination with matching a compensation filter C to the driver response such that both a music compensation and a music removal process can be performed for achieving enhanced ANC taking into account an acoustic leakage without attenuating the wanted input signal IN. Optionally, the FB ANC can likewise be adaptive based on the leakage condition.

The invention claimed is:

1. An audio system for an ear mountable playback device comprising
a speaker configured to generate a speaker signal on the basis of an audio output signal;
an error microphone configured to generate a disturbed audio signal on the basis of ambient noise and the speaker signal;
a further microphone configured to generate a noise signal on the basis of the ambient noise;
a first noise filter configured to
generate a first compensation signal by applying filter operations to the noise signal; and
be adapted based on a compensated error signal;
a first mixer configured to generate the audio output signal by superimposing an audio signal, the first compensation signal and a second compensation signal;
a compensation filter configured to
generate a third compensation signal by applying filter operations to the audio signal; and
be adapted based on an acoustic leakage condition;
a second noise filter configured to generate the second compensation signal by applying filter operations to an intermediate compensation signal that is generated by subtracting the third compensation signal from the disturbed audio signal;
an error compensation unit configured to generate the compensated error signal on the basis of the disturbed audio signal and the third compensation signal; and
a detection unit configured to estimate the acoustic leakage condition on the basis of the first noise filter or of the disturbed audio signal and the audio output signal, wherein
for generating the compensated error signal, an adjustable gain is applied to the third compensation signal; and
for generating the intermediate compensation signal, the adjustable gain is not applied to the third compensation signal.

2. The audio system according to claim 1, wherein the compensation filter is configured to match a leakage-dependent driver response between the speaker and the error microphone.

3. The audio system according to claim 1, wherein the error compensation unit comprises a second mixer configured to generate the compensated error signal by subtracting from the disturbed audio signal a removal signal that is based on the third compensation signal.

4. The audio system according to claim 3, wherein the error compensation unit further comprises a filter element configured to generate the removal signal from the third compensation signal.

5. The audio system according to claim 4, wherein for generating the removal signal, the filter element is configured to apply filter operations to the third compensation signal.

6. The audio system according to claim 4, wherein for generating the removal signal, the error compensation unit is configured to control an adjustable gain of the filter element depending on the third compensation signal and the compensated error signal.

7. The audio system according to claim 6, wherein the error compensation unit is configured to control the adjustable gain by means of a feedback loop.

8. The audio system according to claim 6, wherein the error compensation unit is configured to control the adjustable gain by applying an error minimization algorithm to the third compensation signal and the compensated error signal.

9. The audio system according to claim 6, wherein the error compensation unit is configured to control the adjustable gain by applying a least mean squares algorithm to the third compensation signal and the compensated error signal.

10. The audio system according to claim 1, wherein the second noise filter is further configured to be adapted based on the leakage condition.

11. The audio system according to claim 1, wherein the detection unit is configured to estimate the leakage condition
on the basis of the disturbed audio signal and the audio output signal if a ratio between the speaker signal and the ambient noise exceeds a set threshold; and
on the basis of the first noise filter otherwise.

12. The audio system according to claim 1, wherein the leakage condition characterizes an acoustic leak between an ambient of the playback device and a volume which is defined by an ear canal of a user and a cavity of the playback device, wherein the cavity is arranged at a preferential side for sound emission of the speaker.

13. The audio system according to claim 1, wherein estimating the leakage condition comprises determining a leakage value.

14. The audio system according to claim 1, wherein the compensation filter is adapted on the basis of a comparison of the leakage condition with reference leakage conditions in a lookup table.

15. The audio system according to claim 1, wherein the detection unit is configured to estimate the acoustic leakage condition on the basis of the first noise filter and on the basis of the disturbed audio signal and the audio output signal.

16. An ear mountable playback device comprising an audio system according to claim 1.

17. The audio system according to claim 1, wherein the detection unit is configured to estimate the leakage condition
on the basis of the disturbed audio signal and the audio output signal if a ratio between the speaker signal and the ambient noise exceeds a set threshold; and
on the basis of filter parameters of the first noise filter otherwise.

18. A signal processing method for an ear mountable playback device with a speaker generating a speaker signal based on an audio output signal, with a further microphone configured to generate a noise signal on the basis of ambient noise, and with an error microphone configured to generate a disturbed audio signal on the basis of the speaker signal and the ambient noise, the method comprising
generating a first compensation signal by applying filter operations of a first noise filter to the noise signal;
generating the audio output signal by superimposing an audio signal, the first compensation signal and a second compensation signal;
generating a third compensation signal by applying filter operations of a compensation filter to the audio signal; and
generating the second compensation signal by applying filter operations of a second noise filter to an intermediate compensation signal that is generated by subtracting the third compensation signal from the disturbed audio signal;
generating a compensated error signal based on the disturbed audio signal and the third compensation signal;

estimating a leakage condition on the basis of the first noise filter or of the disturbed audio signal and the audio output signal;

adapting the first noise filter based on the compensated error signal; and adapting the compensation filter based on the leakage condition, wherein for generating the compensated error signal, an adjustable gain is applied to the third compensation signal and for generating the intermediate compensation signal, the adjustable gain is not applied to the third compensation signal.

* * * * *